Aug. 19, 1969  N. E. R. NILSON  3,461,949
APPARATUS FOR MAKING THREADED MOULDS
Filed Sept. 27, 1966

INVENTOR.
Nils Emil Rune Nilson
BY Greer Marechal Jr.
Attorney

United States Patent Office 3,461,949
Patented Aug. 19, 1969

3,461,949
APPARATUS FOR MAKING THREADED MOULDS
Nils Emil R. Nilson, Saltsjo-Boo, Sweden, assignor to Svenska Rotor Maskiner Aktiebolag, Nacka, Sweden, a corporation of Sweden
Filed Sept. 27, 1966, Ser. No. 582,311
Int. Cl. B29d 1/00; B22c 9/22
U.S. Cl. 164—216
7 Claims

ABSTRACT OF THE DISCLOSURE

Apparatus for making moulds to produce multi-threaded screw castings comprising a frame and a moulding flask and a stationary guide sleeve mounted thereon. The apparatus includes a shaft rotatably and axially movably mounted in said guide sleeve. The shaft carries a pattern of a multi-threaded screw casting at one end and a cylindrical portion slidable in said guide sleeve at said other end. The cylindrical portion has a single helical groove having the same pitch as the multi-threaded screw of the pattern. The guide sleeve carries a pin which is positioned to engage said helical groove whereby upon rotation of said shaft it moves axially relative to said sleeve and rotates following the pitch of said helical groove.

---

The present invention relates to an appartus for making moulds to produce screw-threaded castings which apparatus comprises a pattern of the casting connected to a shaft which is rotatably and axially movably mounted in a frame supporting the flask, means for guiding said shaft axially and a lead screw means having the same pitch as the pattern. The invention has for its object to provide an apparatus of this type which renders it possible to cast screw-threaded articles with high precision and which when compared with previously known devices is cheap and simple to manufacture and permits change of patterns without complicated assembling work.

The apparatus according to the invention is substantially characterized in that the pattern is rigidly secured to the shaft which is provided with a cylindrical portion having a helical groove, said cylindrical portion being guided in a sleeve secured to the frame and said sleeve carrying a pin engaging said helical groove.

The invention will now be described more in detail with reference to the accompanying drawing which illustrates an embodiment of an apparatus according to the invention intended for making moulds for casting rotors of screw rotor machines. In the drawing:

FIG. 1 is a side view of the apparatus shown partly in section, while

Figure 1:
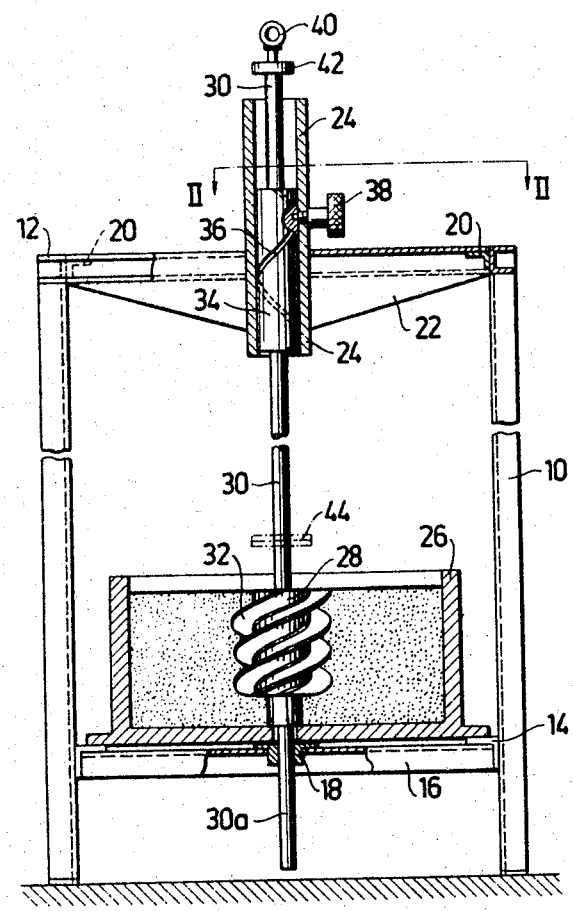
Figure 2:
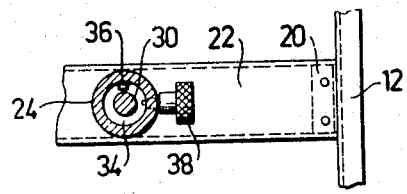
FIG. 2 is a view taken along line II—II in FIG. 1 and showing certain details of the apparatus.

According to FIG. 1 the apparatus comprises a frame of parallelepipedic shape and composed of four vertical pillars 10 of U-shaped cross section. The upper ends of the pillars are interconnected by means of a rectangular frame element 12 which is likewise made from U-profiles. At some distance from the lower ends the four pillars 10 are interconnected by means of a frame element made from angle bars 14.

A bridge 16 of U-shaped cross section is welded to two opposite angle bars 14 and supports a bearing 18. Brackets 20 are welded to the frame element 12 and carry in a corresponding manner a bridge 22 to which is secured a sleeve 24 coaxial with the bearing 18. The bridge 22 is removably connected with the brackets 20 by means of bolts or the like.

A flask 26 is supported by the frame element formed by the angle bars 14 and is secured to said frame element in any suitable manner, for instance by means of bolts.

In the flask 26 there is inserted a pattern 28 of a rotor for a screw rotor machine. This pattern 28 is secured to a shaft 30 and the lower portion 30a of this shaft extends through an opening in the bottom of the flask 26 and further through the bearing 18. In the embodiment shown the pattern 28 has four helical lands 32 the wrap angle of which amounts to about 300°. At its upper end the shaft 30 is provided with an axial guide element 34 fitting in the sleeve 24 and having a helical groove 36 of the same pitch as a land 32 of the pattern 28. A screw 38 is threaded through a bore in the sleeve 24 and the pin-like end of this screw engages the groove 36.

In the embodiment shown the shaft 30 extends upwardly above the guide element 34 and is at its upper end provided with a rotatable eye bolt 40. A hand-wheel 42 is secured to the shaft 30 at a small distance below the eye bolt 40.

When the different elements occupy the positions shown in FIG. 1 the flask 26 is filled with mould material, for instance mould sand, which is rammed in the usual manner while seeing to it that the sand level must not rise above the upper edge of the pattern 28. A lifting force is then applied to the eye bolt 40 and in dependence on the screw pitch and other factors the pattern 28 is screwed out of the mould material either fully automatically or under manual control by means of the hand-wheel 42 for according to circumstances the movement can be braked or facilitated, as required, by means of the hand-wheel 42.

When the pattern 28 is entirely extracted from the mould material the bridge 22 can be detached from the brackets 20 and thereafter the shaft 30 and the pattern 28 can be completely removed from the frame so that the flask 26 with the finished mould can be lifted out.

In the embodiment shown the bearing 18 forms an axial guide for the lower shaft end 30a while the sleeve 24 forms an axial guide for the guide element 34 which in this case also forms a helical guide.

The pattern 28, the shaft 30 and the guide element 34 may form an undivided unit but in FIG. 1 there is indicated by broken lines that the pattern 28 and the lower portion of the shaft 30 may be detachably secured to the upper shaft portion 30 by means of a coupling 44. Hereby it is possible to use one and the same guide element 34 for patterns of different diameter and of different axial length but having equal screw pitch.

In order to make it possible to extract the pattern 28 from the mould material the length of the shaft 30 above the pattern must be greater than the axial extent of the pattern 28.

If the axial guide above the pattern 28 is made sufficiently rigid the lower axial guide may be dispensed with so that the lower shaft end 30a, the bridge 16, the bearing 18 and the opening in the bottom of the flash 26 are eliminated. In that case there may be provided a purely axial guiding means above or below the combined guide 24, 34.

Manual, electric or hydraulic lifting means of known types may be used to lift the pattern 28. For instance, with the embodiment shown in the drawing it may often be suitable to provide a hydraulic jack coaxially with the shaft 30 and below the lower end of the shaft portion 30a.

The invention is not limited to the use of a certain type of mould material. Thus, good results have been obtained with different types of mould sand as well as with mould masses of the type which is poured into the flash in a viscid state and is thereafter hardened. For instance, it is possible to use such mould masses and such methods of making moulds which are described in Swedish patent specifications 151,781 and 161,279. Often it is advantageous to coat the pattern with an antiadhesion agent in known manner.

Particularly when using certain castable mould materials it has proved to be possible to achieve such a smoothness of the surface of the cast screw that a subsequent machining can be dispensed with or can be limited to grinding only. When a high accuracy is desired such a grinding may be necessary also for the reason that the pattern usually must be dimensioned while taking into consideration the shrinking of the cast product. This shrinking is often difficult to estimate in advance and for safety it is therefore advisable to dimension the pattern such that the cast product must be subjected to a subsequent machining in order to get the correct dimensions. As pointed out above this subsequent machining may be restricted to grinding but when sand moulds are used the smoothness of the cast article is often such that a milling or planing operation is necessary. Due regard must be paid to this fact when making the pattern.

The shaft carrying the pattern must be very rigid and its movements accurately guided and therefore the shaft is preferably made from steel and its guide means from, for instance, bearing metal. The pattern proper can be made from almost any material such as steel, aluminum or other metal, plastic or wood, i.e. also materials which are easy to machine or form and which have the inherent property of presenting a surface having a low tendency to adhere to the mould material.

What I claim is:

1. An apparatus for making moulds to produce a multi-threaded screw casting comprising,
   a frame,
   a moulding flask supported on said frame,
   a stationary guide sleeve supported on said frame,
   a shaft guided for rotatable and axial movement relative to said guide sleeve,
   a multi-threaded screw pattern of the casting mounted on said shaft for movement therewith, said multi-threaded screw pattern being adapted to be threaded out of said flask,
   said shaft having a cylindrical portion axially mounted thereon and adapted to move in said sleeve to guide said shaft for its rotation and axial movement, said guide sleeve and cylindrical portion forming an axial guide, having sufficient rigidity to enable said pattern to make a high precision mould,
   said cylindrical portion having a single helical groove formed in the surface thereof and having the same pitch as the threads of said pattern,
   an inwardly extending pin on said sleeve engaging said helical groove,
whereby upon rotation of said shaft the same moves axially relative to said sleeve and flask a distance corresponding to the pitch of said helical groove to cause said pattern to threadedly rotate out of said flask.

2. The apparatus of claim 1 wherein said guide sleeve and said cylindrical portion of said shaft are each of sufficient length in the axial direction that axial movement of said cylindrical portion relative to said guide sleeve causes corresponding axial movement of said pattern with substantially no lateral movement thereof.

3. An apparatus according to claim 1 in which the pin consists of the end of a screw threaded into the sleeve.

4. An apparatus according to claim 1 or 2 in which the shaft extends in both directions from the pattern and a bearing is provided in the frame for guiding the shaft part remote from said cylindrical portion.

5. An apparatus according to claim 4 in which the bottom of the flask is provided with an opening for said shaft portion.

6. An apparatus according to claims 1, 2, 4, or 5 in which there is provided a releaseable coupling between said cylindrical portion and said pattern.

7. An apparatus according to claims 1, 2, 4 or 5 in which said shaft is provided with means for applying an axially directed force thereto.

References Cited

UNITED STATES PATENTS

| | | | |
|---|---|---|---|
| 335,331 | 2/1886 | Anderson | 164—216 |
| 931,760 | 8/1909 | Hattersley | 164—216 |
| 1,544,059 | 6/1925 | Dimik | 164—216 X |
| 1,856,166 | 5/1932 | Nordfeldt et al. | 164—216 X |
| 1,926,092 | 9/1933 | Georgen | 164—216 |
| 2,363,808 | 11/1944 | Sayre | 18—16 |

J. SPENCER OVERHOLSER, Primary Examiner

R. SPENCER ANNEAR, Assistant Examiner

U.S. Cl. X.R.

164—44; 249—59